Sept. 22, 1959  H. J. THIELSCH  2,905,824
FILM HOLDER FOR RADIOGRAPHIC EXAMINATION OF PIPE WELDS
Filed Oct. 8, 1956

FIG. I

COOLANT OUT

INVENTOR.
Helmut J. Thielsch
BY
David D. McKenney
ATTORNEY

United States Patent Office 2,905,824
Patented Sept. 22, 1959

2,905,824

FILM HOLDER FOR RADIOGRAPHIC EXAMINATION OF PIPE WELDS

Helmut J. Thielsch, Providence, R.I., assignor to Grinnell Corporation, Providence, R.I., a corporation of Delaware Application October 8, 1956, Serial No. 614,535

7 Claims. (Cl. 250—68)

This invention relates to an apparatus for making radiographic examinations of pipe welds.

More particularly, this invention relates to a radiographic film holder which, by the passage of a coolant fluid therethrough protects the film from high temperatures following the welding process. These high temperatures, which could destroy the film, are due to the heat remaining in the pipes after the application of a layer of weld metal and may also be due to heating by induction coils which are used to maintain the pipes at a "pre-heat" or minimum temperature in order to prevent the formation of cracks in the weld.

In the welding of pipe ends, especially those of steel, it is often desirable to examine the weld after one or more layers of the weld metal have been deposited. To effect this examination one of the more common methods has been to employ radiographic film. This film is placed on one side of the weld and a radioactive source, such as radium, is placed on the other side. The emanations from the radioactive source pass through the weld and strike the film, thus activating the film emulsion. After a suitable exposure time the film, termed a radiograph, is developed and inspected and the quality of the weld, as indicated by the absence of imperfections such as oxides, cracks and fissures, may be determined. If more than a single layer of weld metal is applied, as in the welding of pipes having very thick walls, this process of radiographic inspection is occasionally used after the completion of several such layers of weld material.

While radiographic inspection may be made after the pipes have cooled to temperatures below those which would destroy the film sensitivity, the cooling times involved are long and therefore costly, especially with large size pipes wherein a plurality of weld layers must be deposited to complete the joint.

To protect radiographic film during the inspection of pipe welds the prior art has evolved a rigid jacket which is secured to the outside of the weld close to the pipe, which supports the film adjacent portions of the weld and through which water passes between the film and the weld to protect the film from the heat of the pipes.

One difficulty with this prior art arrangement has been that a rigid jacket which fits close to the exterior pipe surface cannot conveniently be used with more than one pipe size and hence a jacket must be prepared for each size or for a relatively few sizes. Another disadvantage has been that the film carried by these jackets has not extended entirely around the weld but only along a portion of the circumference thereof, so that several exposures have had to be made in order to completely inspect a single weld layer. Finally, it has been a disadvantage of the prior art device that because the passage of the cooling fluid has been between the weld and the film, impurities in the water such as minerals and deposits on the interior of the coolant passageway will appear on the film and may give false indications of weld faults.

Accordingly, it is an object of this invention to provide an improved film-holding water jacket to protect radiographic film used for inspection of a weld.

It is a further object of this invention to provide an improved film-holding water jacket wherein the film placed thereon completely encompasses the weld whereby a single film exposure to radioactive emanations yields a radiograph of the entire weld.

It is a further object to provide an improved film-holding water jacket which may be used to hold radiographic film on pipes of different diameters.

It is another object of this invention to provide an improved film-holding water jacket wherein the emanations from a radioactive source do not pass through a volume of water before striking the film.

These and other objects will become apparent from the following description of the invention.

In the drawings:

Fig. 1 is a perspective view of a preferred film-holding water jacket according to the invention, the jacket being broken to illustrate its cross-section;

Figure 3:
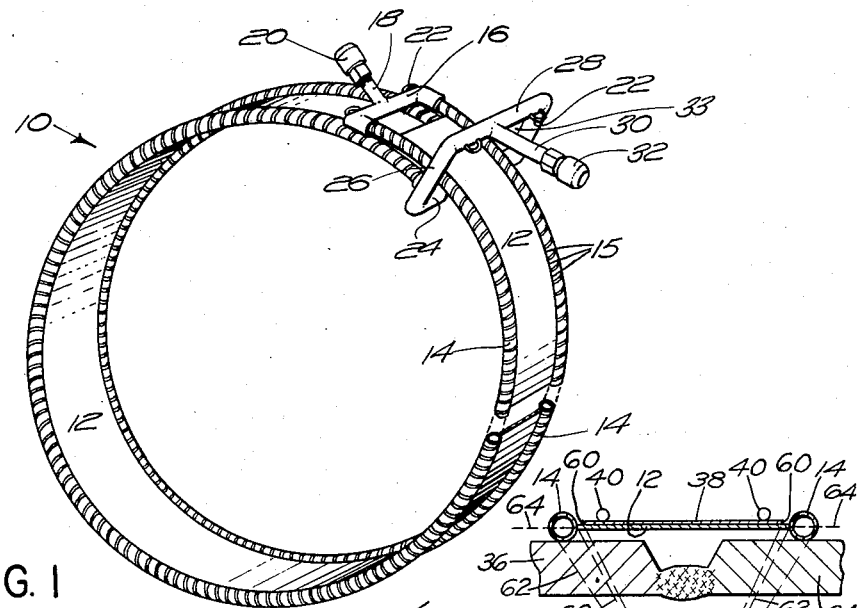
Fig. 3 is a fragmentary cross-section view showing the film-holding jacket of Fig. 2 in position at the outside surface of the pipe ends across the weld.

Referring to the drawings, the numeral 10 denotes a preferred embodiment of a film-holding water jacket according to this invention which is fashioned from a flexible strip 12 of copper or other material having a high heat conductivity. The strip is bounded on its sides by spirally wound flexible conduits 14 of copper or other material also having a high heat conductivity. Each side of the strip is soldered or brazed to the conduit, at locations therealong several of which are indicated at 15, thus making a joint through which heat may readily pass from the strip to the conduits and which permits flexing of the strip and conduit. At one end of the strip 12, the conduits 14 terminate within the bent ends of a transversely extending tubular portion 16. A tubular extension 18 is secured at one of its ends to portion 16 and at its other end carries a pipe union 20. Eyes 22 are spaced along the portion 16.

At the other end of the strip the conduits 14 terminate within the bent ends of outwardly extending tubular segments 24 which in turn terminate in the ends of upwardly extending tubular segments 26, the other ends of which are joined by a transversely extending tubular segment 28, also having spaced eyes 22 thereon. A tubular extension 30 is secured at one end to the segment 28 and carries a union 32 at its other end.

Figure 2:
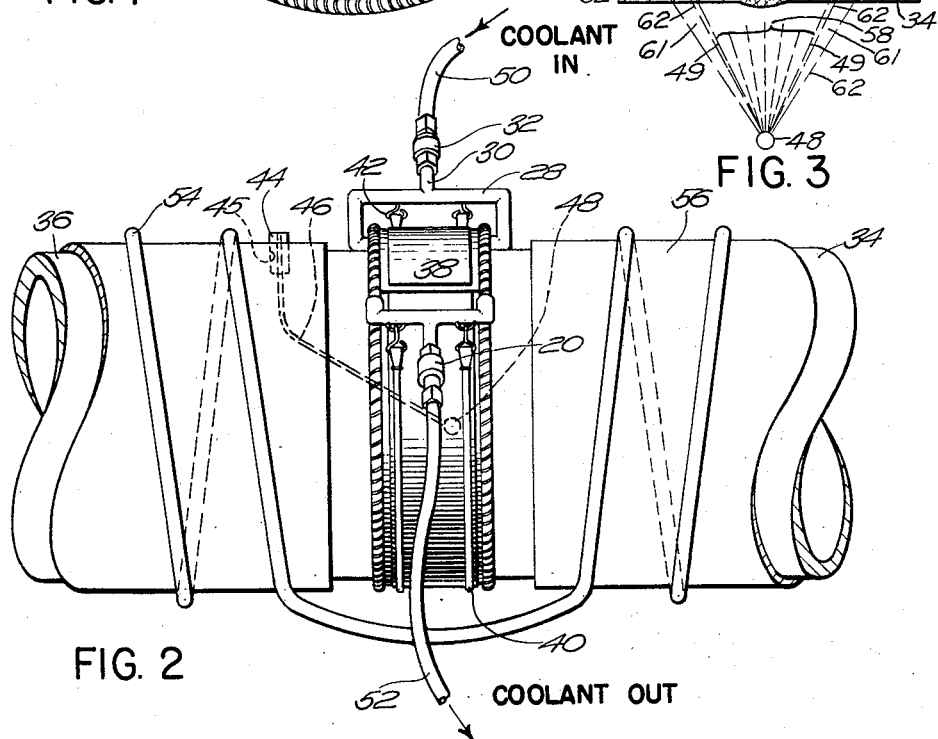
Fig. 2 is a side elevation view showing the film-holding water jacket of Fig. 1 wrapped around a pipe weld and carrying a photographic film.

The segments 24, 26, and 28 form an opening 33 which can receive the tubular portion 16 so that this portion and the elements 18 and 20 carried thereby may be inserted into the opening in the overlapping position shown in Figs. 1 and 2. From the further description which follows, it will be seen that the tubular portion 16, extension 18, segments 24, 26, 28 and extension 30 need not be flexible but may be formed of relatively rigid conduit material such as copper tubing.

In Fig. 2 of the drawings, the film holder is shown applied to a weld joining two pipes 34 and 36 while a radiograph is being made. The holder is shown wrapped around the weld with the elements 16, 18 and 20 inserted in the opening 33 and with the ends of the strip 12 overlapping. A radiographic film 38 is located on the exterior portion of the strip 12 with its ends also preferably overlapping. Elastic bands 40 having hooks 42 are drawn around the film and the hooks 42 placed in the eyes 22. These bands maintain the jacket in a contracted configuration so that it snugly encompasses the weld area of the pipes and also maintains the film 38 in position. A plug 44 extending through a hole 45 in one of the pipes has an extension 46 which carries a radioactive source 48 such as radium substantially into the plane of the weld and substantially at the axis of the pipes 34 and 36. Fig. 3, which is a fragmentary cross-section view of the assembly of Fig. 2, shows emanations 49 from the radioactive source 48 passing through the weld area to the film 38.

A coolant, usually water, passes through a hose 50 connected to union 32 and divides at the junction of segments 30 and 28. Then the coolant passes through the conduits 14 and thence through portions 16, 18, union 20 and out through hose 52. The jacket is left in the position shown in Fig. 2 until the emanations from the radioactive source 48 passing through the weld activate the film, thus making a radiograph of the weld. Because the ends of the film 38 overlap, the entire extent of the weld may be examined in a single exposure.

When the film holder is placed around the weld area as shown in Fig. 2 and during the exposure, the temperature at the weld area is ordinarily between 500° and 600° F. This order of temperature must be maintained in welding certain metals and particularly in welding heavy walled pipe to prevent cracking of the weld layers. Accordingly, heating induction coils 54 are employed for this purpose. They may be wrapped around an asbestos covering 56 on the pipes.

The film 38 is protected from the heat in the weld area by the shielding effect of the strip 12 the temperature of which does not rise above the safe temperature for the film due to the rapid conduction of heat from the strip to the flexible conduits 14 and thence to the circulating coolant fluid which carries it away.

Despite corrosion of or accumulation of mineral deposits on the interior of the flexible conduits 14, the radiograph will not be affected since the radioactive emanations which pass through the weld (see Fig. 3) and activate the film do not also pass through the coolant passages.

The following table will illustrate the advantageous results attendant the use of this invention. The entries are given for a weld wherein the pipe sections were 12 inches outside diameter with a wall thickness of 1.3 inches. The pipe temperature was 550° F. and the coolant (water) flow rate was 2.2 gallons per minute. The strip 12 was .025 inch thick, the flexible tubing was 3/8 inch in diameter and both were of copper.

| Position on weld | Coolant water temperature (° F.) | | |
|---|---|---|---|
| | 70 | 80 | 90 |
| | Pipe temperature (° F.) | | |
| Water inlet | 79 | 84 | 88 |
| Water outlet | 91 | 99 | 105 |

The foregoing description shows that none of the emanations which reach the film passes first through the cooling water. This can be otherwise described with further reference to Fig. 3 in which it will be seen that a first zone 58 located entirely on the pipe-side of the strip 12 is defined by lines 49 drawn from the radioactive source 48 (which is on a line perpendicular to the strip 12) to the edges 60 of the surface which the film covers. Additional zones 61 may be defined by lines 62 emanating from the radioactive source 48 and extending to those portions of the conduits 14 which lie on the pipe-side of the strip 12. In any given arrangement the portions (if any) of the conduits 14 which thus lie on the pipe-side of the strip 12 can be determined by drawing a line 64 which extends the plane of the strip 12 and by then determining where this line passes through the conduit.

I claim:

1. A film holder assembly for radiographic examination of welds including: a strip of heat conductive material having one side adapted to be presented to a weld and having a surface on the opposite side adapted to be covered by a film, a first zone entirely on said one side of said strip defined by the edges of said surface and a point which is located on said one side of said strip on a line extending perpendicular therefrom and from which emanations one adopted to radiate, and a conduit of heat conductive material defining a fluid path, said conduit being joined to said strip and extending substantially lengthwise therealong, a second zone which is also entirely on said one side of said strip and which is defined by said point and by the boundaries of any portion of said conduit which is on said one side of said strip, and a substantial portion of said first zone being non-coextensive with said second zone, whereby said film may be presented to a source of emanations without obstruction by fluid in said conduit.

2. A film holder assembly as set forth in claim 1 wherein said conduit is secured to one edge of said strip along the length thereof.

3. A film holder assembly for radiographic examination of welds including: a strip of heat conductive material having one side adapted to be presented to a weld and to a source of emanations on the other side of said weld and having a surface on the opposite side adapted to be covered by a radiographic film, and a pair of conduits of heat conducting material each defining a fluid path, said conduits being secured to the edges of said strip and extending substantially lengthwise therealong, and a substantial portion of said strip being located remote from said conduits.

4. An assembly for the radiographic examination of welds including: a pipe weld, a film holder located on and around the weld, said holder comprising a strip of heat conductive material and a conduit of heat conductive material defining a fluid path, said conduit being joined to said strip and extending substantially lengthwise therealong, a film sensitive to radioactive emanations and located on the side of the strip remote from said weld, said film spaced laterally from said conduit, and one end of said strip overlapping the other end thereof.

5. A film holder assembly for radiographic examination of welds including: a flexible strip element of heat conductive material having one side adapted to be presented to a weld and having its opposite side adapted to receive a film, a pair of conduit elements of heat conductive material each defining a fluid path, said conduit elements being secured to the edges of said strip element, a first fitting element connecting said conduit elements to a common fluid supply at one end of said assembly and a second fitting connecting said conduit elements to a common fluid outlet at the other end of said assembly, one of said fitting elements defining a boundary of an opening which receives the other end of said assembly.

6. The assembly of claim 1 wherein said strip and said conduit are flexible, whereby the assembly may be curved to lie against the surfaces of curved articles to be welded together.

7. The assembly of claim 6 wherein the strip is rigidly joined to said conduit at a plurality of spaced points therealong.

References Cited in the file of this patent

UNITED STATES PATENTS 2,494,740     Boucher     Jan. 17, 1950
2,587,056     McElroy et al.     Feb. 26, 1952